Dec. 16, 1941. F. L. MAIN 2,266,504
MASTER CYLINDER
Filed April 18, 1938
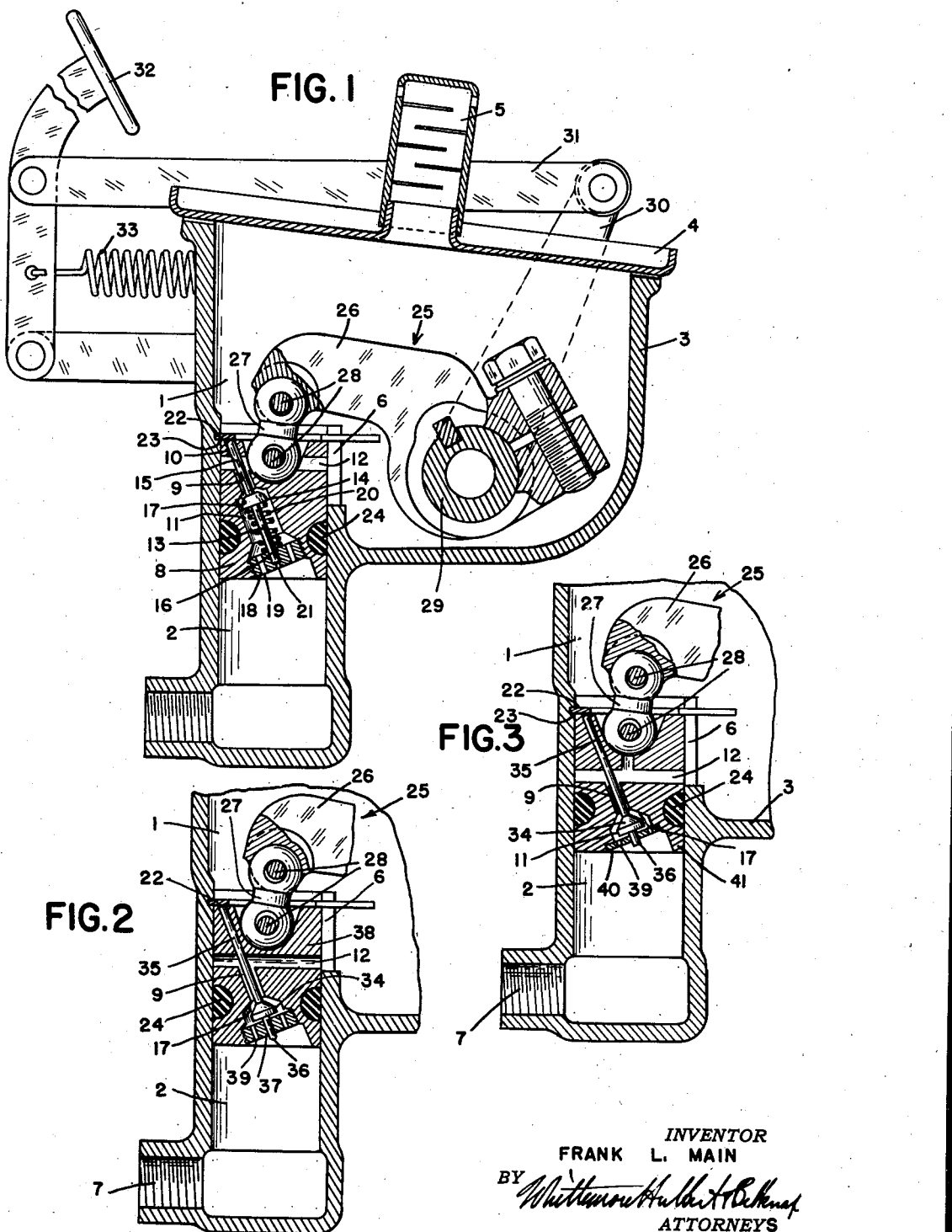
INVENTOR
FRANK L. MAIN
BY Whittemore Hulbert Belknap
ATTORNEYS Patented Dec. 16, 1941

2,266,504

UNITED STATES PATENT OFFICE 2,266,504

MASTER CYLINDER

Frank L. Main, Birmingham, Mich., assignor to Kelsey-Hayes Wheel Company, Detroit, Mich., a corporation of Delaware Application April 18, 1938, Serial No. 202,791

4 Claims. (Cl. 60—54.6)

The invention relates to hydraulic brake apparatus for use particularly with motor vehicles and refers more especially to master cylinders for producing pressure upon the braking fluid to apply the brakes.

The invention has for one of its objects to provide an improved construction of master cylinder of that type having a piston provided with a passage therethrough adapted to place the pressure end of the cylinder in communication with the reservoir.

The invention has for another object to provide a valve for controlling the piston passage and means upon the cylinder for directly opening the valve during the portion of the retractile movement of the piston.

The invention has for a further object the provision of means for guiding the valve and for also controlling its sensitivity to operation.

The invention has for other objects the novel features of construction and combinations and arrangements of parts as more fully hereinafter set forth.

In the drawing—

Figure 1 is a vertical section through a master cylinder showing an embodiment of my invention;

Figures 2 and 3 are views similar to portions of Figure 1 showing other embodiments of my invention.

Referring to the embodiment of my invention as illustrated in Figure 1, 1 is the reservoir of the master cylinder and 2 the cylinder. The reservoir is formed of the hollow body 3 having an open upper end and the cover 4 suitably detachably secured to the upper end of the body. This cover is provided with the breather 5 for placing the reservoir in communication with the surrounding air. The cylinder 2 is preferably formed integral with the reservoir body 3 and extends generally vertical. The upper end of this cylinder is located above the bottom wall of the body and opens into the reservoir. Also the upper inner portion of the side wall of the cylinder is formed with the longitudinal slot 6. The lower or pressure end portion of the cylinder is provided with the port 7 for the passage of the braking fluid for applying the brakes. This braking fluid is preferably a braking liquid, the normal level of which is located near the upper end of the reservoir body.

8 is the piston reciprocable within the cylinder 2 and provided with the generally longitudinally extending passage 9 therethrough. This passage is inclined in the piston from its lower to its upper ends, the lower end of the passage having its axis substantially registering with the axis of the piston and the upper end of the passage terminating adjacent the outer surface of the piston. The passage is formed with the upper portion 10 of smaller diameter or cross sectional area than the lower portion 11. The piston is provided below its upper end with the transverse passage 12 opening into the upper passage portion 10 and the slot 6 to thereby increase the amount of available fluid in the reservoir. For controlling the passage 9, I have provided the valve 13 having the head 14 and the stems 15 and 16 in alignment and extending generally upwardly and downwardly from the head. The head is engageable with the valve seat 17 formed in the piston at the junction of the upper and lower passage portions. The valve stem 15 extends freely through the upper passage portion 10 and is guided upwardly beyond the transverse passage 12 by the upper end of the piston. The valve stem 16 is guided by the plug 18 which is threaded into the lower or pressure end portion of the piston. This plug is formed with the openings 19 which provide a passage for placing the lower passage portion 11 in communication with the pressure end portion of the cylinder.

20 is a coil spring encircling the lower stem 16 and abutting the plug 18 and the head 14 and adapted to urge the head toward the seat 17. This spring is calibrated so that it preferably allows the valve to open when a predetermined vacuum in the pressure end of the cylinder occurs.

The openings 19 are preferably made of predetermined size or area to meter the flow of the braking liquid therethrough and to secure a desired sensitivity to operation of the valve. The size of the openings 19 governs the movement of fluid from the enlarged portion 11 of the passage 9 to the cylinder 2 upon the creation of a vacuum in the cylinder and, accordingly, regulates the time of opening of the valve 13 when a vacuum is created due to retraction of the piston.

The plug is provided with the axial opening 21 of smaller size than the bore for receiving and guiding the lower end of the lower valve stem 16 to thereby avoid building up of pressure in the bore during the movement of the valve.

For assuring the opening of the valve, I have provided the stop 22 upon the cylinder 2 and engageable with the upper end of the upper valve stem 15 during the final portion of the retractile movement of the piston 8. This stop is preferably in the nature of a resilient wire extending within the groove 23 formed in the wall of the cylinder. The stop is also engageable with the upper end of the piston to limit its retractile movement.

The piston is provided with the annular packing member 24 which is in the nature of a rubber ring within an annular groove in the piston and engageable with the wall of the cylinder.

For reciprocating the piston, I provide the bell crank 25 within the reservoir and having its arm 26 connected to the piston by means of the connecting rod 27. This rod preferably has upper and lower ball portions engageable during the advancement of the piston with cooperating bearing surfaces upon the piston and arm, the ball portions being loosely connected to the piston and arm by suitable pins 28. The hub of the bell crank is fixedly secured upon the shaft 29 which extends through and is journaled in the side walls of the reservoir body 3. One end of this shaft has secured thereto the lever 30, the free end of which is connected by the link 31 to the foot pedal 32 which is normally held in inoperative or "off" position by the spring 33.

The stop is engageable with both the upper end of the upper valve stem and the upper end of the piston when the piston is in retracted position so that the pressure end of the cyinder is in communication with the reservoir through the piston passages 9 and 12 and the slot 6 as well as the open upper end of the cylinder. In this connection, it will be noted that the transverse passage 12 communicates with the recess formed in the upper end of the piston and having the bearing surface for the lower ball portion of the connecting rod. Upon depressing the foot pedal, the piston will be advanced and moved away from the stop so that during the initial portion of the advancement the valve will move against its seat in the piston, after which continued advancement of the piston produces pressure upon the braking liquid to apply the brakes. Upon retractile movement of the piston under the influence of the spring connected to the foot pedal, vacuum will be produced in the cylinder and when this vacuum reaches a predetermined degree the valve spring will be overcome allowing the valve to move downwardly to open position and permitting the braking liquid to pass through the piston to the pressure end of the cylinder. During the final portion of the retractile movement, the stop is adapted to engage the upper valve stem to assure positive opening of the valve. In the event that the valve spring becomes broken, it will be seen that the plug at the pressure end of the piston limits the opening movement of the valve so that upon advancement of the piston the pressure of the braking liquid will operate upon the valve to close the same, the sensitivity of the valve depending upon the metered openings 19 in the plug.

The embodiment illustrated in Figure 2 differs mainly from that illustrated in Figure 1 in that no valve retracting spring is employed. More particularly, the valve has the head 34 and the upwardly and downwardly extending stems 35 and 36 respectively. The stem 36 is guided in the plug 37 which is screwed into the lower or pressure end portion of the piston 38 and which is engageable with the valve head to limit the downward opening movement of the valve. This plug is provided with the openings 39 which are of predetermined size to meter the flow of the braking liquid therethrough to provide the desired sensitivity to operation of the valve.

The modification illustrated in Figure 3 differs essentially from that illustrated in Figure 2, in that the plug 40 is a stamped Welch plug having a press fit in the lower or pressure end portion of the piston 41. This plug guides the lower valve stem of the valve, acts as a stop for the valve when moving to open position, and also has the metered holes for securing the desired sensitivity to operation of the valve.

What I claim as my invention is:

1. In a master cylinder, a reservoir, a generally vertical cylinder having the upper end in communication with said reservoir and the lower end provided with a braking fluid port, a piston reciprocable within said cylinder having a passage extending generally longitudinally therethrough establishing communication between said reservoir and said cylinder and formed with an upper portion of smaller cross-sectional area than the lower portion, said piston having a valve seat at the junction of said upper and lower portions, a valve for controlling said passage, said valve having a head located within said lower portion and engageable with said valve seat, and stems extending generally upwardly and downwardly from said head, said generally upwardly extending stem freely engaging said upper passage portion to permit the passage of fluid therethrough to and from said reservoir, and a detachable member carried by said piston for guiding the other of said stems, said member having a passage therethrough of less cross sectional area than the upper passage portion to meter the flow of braking fluid therethrough.

2. In a master cylinder, a reservoir, a generally vertical cylinder having the upper end in communication with said reservoir and the lower end provided with a braking fluid port, a piston reciprocable within said cylinder having a passage extending generally longitudinally therethrough establishing communication between said reservoir and said cylinder and formed with an upper portion of smaller cross sectional area than the lower portion, said piston being provided with a valve seat at the junction of said upper and lower passage portions, a valve for controlling said passage, said valve having a head located within said lower passage portion and movable upwardly to engage said valve seat, and stems extending in opposite directions from said head, one of said stems extending freely within said upper passage portion to permit the passage of fluid therethrough to and from said reservoir, a member carried by said piston for guiding the other of said stems, said member being provided with a passage for placing said piston passage in communication with the pressure end of said cylinder, the passage in said member having a cross sectional area less than the piston passage to meter the flow of fluid into the cylinder, and means upon said member adapted to limit downward movement of said valve.

3. In a master cylinder, a reservoir, a cylinder having one end communicating with the reservoir and having a port at the other end for braking fluid, a piston reciprocable within said cylinder having a passage extending generally longitudinally therethrough establishing communication between the reservoir and cylinder, said passage having an enlargement at the pressure side of the piston and having a valve seat surrounding the passage within the enlargement, a valve for controlling the passage having a head engageable with the valve seat, and means carried by the piston at the pressure side thereof beyond the valve seat for metering the flow of fluid into the cylinder at the pressure side of the piston.

4. In a master cylinder, a reservoir, a cylinder having one end communicating with the reservoir and having a port at the other end for braking fluid, a piston reciprocable within said cylinder having a passage extending generally longitudinally therethrough establishing communication between the reservoir and cylinder, said passage having an enlargement at the pressure side of the piston and having a valve seat surrounding the passage within the enlargement, a valve for controlling the passage having a head engageable with the valve seat, and a closure for the end of the enlargement at the pressure side of the piston secured to the piston beyond the valve seat and having a port therethrough of less cross sectional area than the passage through the piston for metering the flow of fluid from the enlargement to the portion of the cylinder at the pressure side of the piston.

FRANK L. MAIN.